(12) United States Patent
Mankowski et al.

(10) Patent No.: US 11,687,081 B2
(45) Date of Patent: Jun. 27, 2023

(54) MOTOR CONTROLLER AND METHOD FOR LOADING AND UNLOADING TRACTORS ON FLATBED TRAILERS

(71) Applicant: Accelerated Systems Inc., Waterloo (CA)

(72) Inventors: Peter Mankowski, Cambridge (CA); Andrei Buin, Waterloo (CA); Claudia Demandt, Conestogo (CA); Willem Jager, Cambridge (CA)

(73) Assignee: Accelerated Systems Inc., Waterloo (CA)

( * ) Notice: Subject to any disclaimer, the term of this patent is extended or adjusted under 35 U.S.C. 154(b) by 339 days.

(21) Appl. No.: 17/204,372

(22) Filed: Mar. 17, 2021

(65) Prior Publication Data

US 2021/0294334 A1    Sep. 23, 2021

Related U.S. Application Data

(60) Provisional application No. 62/993,601, filed on Mar. 23, 2020.

(51) Int. Cl.
*B60P 3/06* (2006.01)
*G05D 1/02* (2020.01)
*G05D 1/00* (2006.01)
*B60P 1/43* (2006.01)

(52) U.S. Cl.
CPC ............ *G05D 1/0212* (2013.01); *B60P 1/435* (2013.01); *B60P 3/06* (2013.01); *G05D 1/0088* (2013.01); *G05D 1/0236* (2013.01); *G05D 2201/0208* (2013.01)

(58) Field of Classification Search
CPC .. G05D 1/0212; G05D 1/0088; G05D 1/0236; G05D 2201/0208; B60P 1/435; B60P 3/06

See application file for complete search history.

*Primary Examiner* — Mathew Franklin Gordon

(57) ABSTRACT

A method for driving a tractor on a flatbed trailer. The method includes locating a starting position of the tractor, determining a final position for the tractor, and searching for a ramp attached to the flatbed trailer. A driving path is calculated to drive the tractor from the starting position, along the ramp, and to the final position. The tractor is autonomously operated to drive along the driving path. The method may periodically detect an intermediate position of the tractor and determining if the intermediate position is located on the driving path. The driving path may be updated with a course correction to drive the tractor from the intermediate position to the final position. The tractor is stopped after arriving at the final position.

14 Claims, 3 Drawing Sheets

MOTOR CONTROLLER AND METHOD FOR LOADING AND UNLOADING TRACTORS ON FLATBED TRAILERS

RELATED APPLICATIONS

This application claims priority to U.S. Provisional App. No. 62/993,601, filed Mar. 23, 2020 and entitled "Motor Controller and Method for Loading and Unloading Tractors on Flatbed Trailers", the entire contents of which are hereby incorporated by reference herein for all purposes.

TECHNICAL FIELD

The embodiments herein relate to loading tractors and other heavy vehicles onto flatbed trailers. More particularly, the embodiments herein relate to autonomous systems and methods for autonomously driving tractors along ramps attached to flatbed trailers.

INTRODUCTION

The following paragraphs are not an admission that anything discussed in them is prior art or part of the knowledge of persons skilled in the art.

Vehicles in agriculture, heavy construction, and recreational applications occasionally need to be transported using flatbed trailers. The process of loading and unloading vehicles can be difficult. Two people are often needed to load or unload the vehicle. One person drives the vehicle, while the second person acts as a spotter who continuously checks to see if alignment between the vehicle and the flatbed is correct. This is particularly true when the vehicle moves along a ramp attached to the trailer. If there is a misalignment, the vehicle could fall off the ramp. This could cause significant damage to the vehicle or the trailer, and/or injuries to people nearby.

Unfortunately, two people are not always available to load vehicles onto the trailer. This is particularly true for landscapers who transport lawn tractors. When they arrive at the job site, there is often only one person doing the landscaping work. It can be impractical or costly to have a second person solely dedicated to loading and unloading the tractor from the trailer. Similar circumstances arise when truck drivers are transporting heavy equipment such as backhoes and front loaders between job sites. In those cases, the truck driver might need to wait several hours for a second person to arrive and assist them with loading or unloading the heavy equipment from the flatbed trailer. This wastes time, reduces productivity, and incurs unnecessary expenses.

SUMMARY

According to some aspects, there are systems and methods for autonomously driving vehicles from a starting position to a final position. This may include loading or unloading the vehicles.

One general aspect includes a method for driving a tractor on a flatbed trailer. The method may include: locating a starting position of the tractor; determining a final position for the tractor; searching for a ramp attached to the flatbed trailer. The method may include calculating a driving path to drive the tractor from the starting position, along the ramp, and to the final position. The method may include autonomously operating the tractor to drive along the driving path. The method may include periodically detecting an intermediate position of the tractor and determining if the intermediate position is located on the driving path. The method may include updating the driving path with a course correction to drive the tractor from the intermediate position to the final position. The method may include stopping the tractor when it arrives at the final position. The method may include notifying a user in real time that the tractor has arrived at the final position. Other embodiments of this aspect include corresponding computer systems, apparatus, and computer programs recorded on one or more computer storage devices, each configured to perform the actions of the methods.

The method may include validating a human operator with facial recognition before operating the tractor.

The intermediate position may be detected using at least one sensor attached to the flatbed trailer. The sensor may include a backup camera. The intermediate position may be detected by remotely activating an electrical system of a truck attached to the flatbed trailer. The electrical system may operate mirrors on the truck and a camera may use reflections from the mirrors to detect the intermediate position.

The driving path may be determined after verifying details of the ramp and the final position within a flatbed data library. The flatbed data library may be accessed from a communication module on the flatbed trailer. The session data about the driving path and the course correction may be sent to the flatbed data library after the tractor reaches the final position. The flatbed data library may include one or more of: model weights, classification of objects, ramp data, truck data, and prior session data.

Implementations of the described techniques may include hardware, a method or process, or computer software on a computer-accessible medium.

One general aspect includes a tractor motor controller for driving a tractor on a flatbed trailer. The tractor motor controller may include: a sensor input for identifying a starting position of the tractor; and a ramp attached to the flatbed trailer. The controller also includes a processor for: determining a final position for the tractor; calculating a driving path to drive the tractor from the starting position, along the ramp, and to the final position; autonomously operating the tractor to drive along the driving path; periodically detecting an intermediate position of the tractor via the sensor input, and determining if the intermediate position is located on the driving path, and updating the driving path with a course correction to drive the tractor from the intermediate position to the final position; and stopping the tractor when it arrives at the final position. The controller may notify a user in real time that the tractor has arrived at the final position.

Other embodiments include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide exemplary embodiments. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
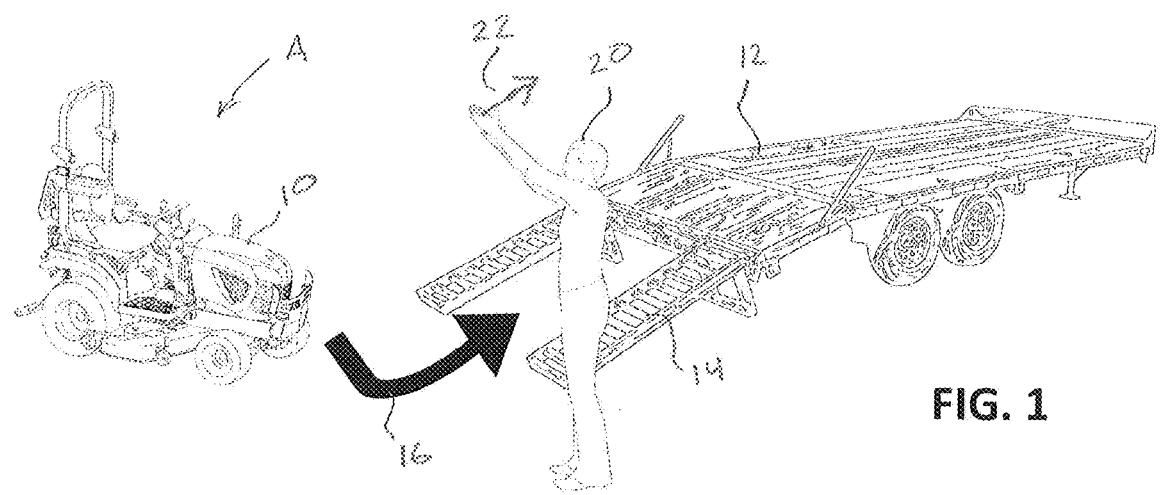
FIG. 1 is a perspective view of a tractor in a starting position before being loaded onto a flatbed trailer.
Figure 2:
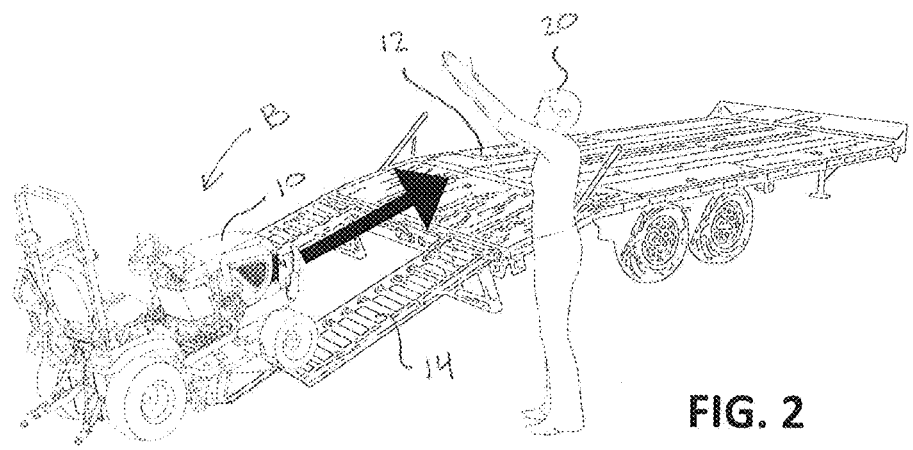
FIG. 2 is a perspective view of the tractor in an intermediate position on a ramp attached to the flatbed trailer.
Figure 3:
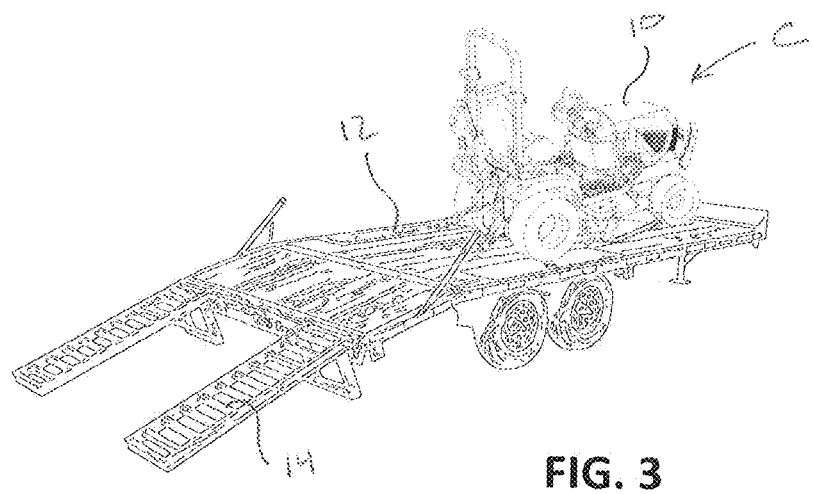
FIG. 3 is a perspective view of the tractor in a final position on the flatbed trailer.

Referring to FIGS. 1-3, there is tractor 10 that is being autonomously driven onto a flatbed trailer 12. The tractor 10 begins at a starting position A, and moves along a driving path 16 to a final position C. There may be one or more intermediate positions B between the starting position A, and the final position C, as will be described below. As shown, the tractor 10 may drive along a ramp 14 attached to the flatbed trailer 12.

A human operator 20 may assist with loading or unloading the tractor 10 onto the flatbed trailer 12. The human operator 20 may initialize autonomous operation of the tractor 10 or help guide the tractor 10 as will be described later below.

Figure 4:
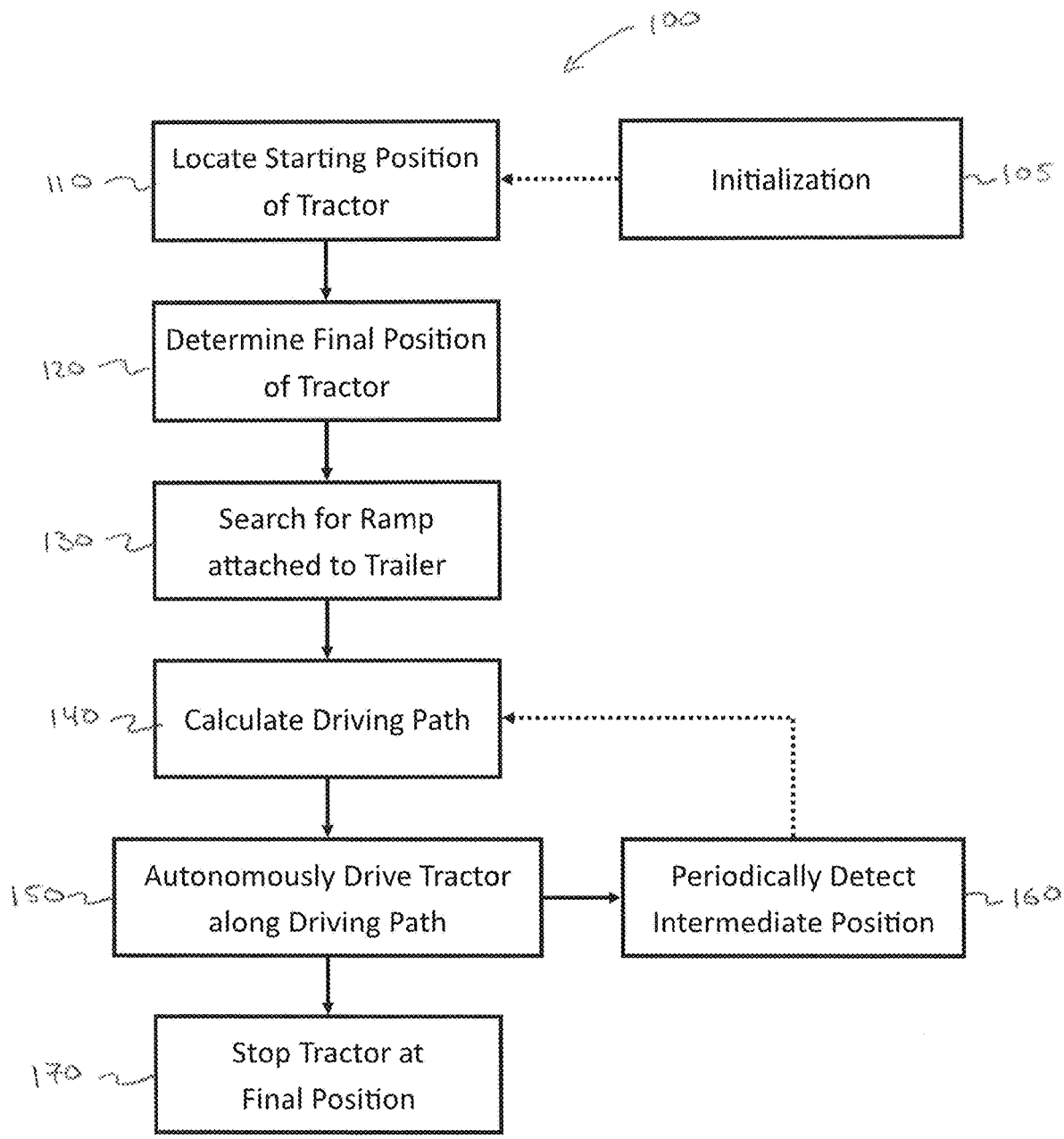
FIG. 4 is a flow chart depicting a method for driving a tractor on a trailer.

Referring now to FIG. 4, there is a method 100 for driving the tractor 10 on a flatbed trailer 12. The method includes steps 110, 120, 130, 140, 150, 160, and 170.

Step 110 includes locating a starting position of the tractor. As shown in FIG. 1, the starting position A may be on the ground, such a s a field or paved area.

Step 120 includes determining a final position for the tractor. As shown in FIG. 3, the final position C may be located on the flatbed trailer 12. In this example, the tractor 10 is being loaded onto the trailer 12.

Step 130 includes searching for a ramp attached to the flatbed trailer. The tractor 10 may drive up the ramp 14 while driving along the driving path to the final position on the trailer 12. hereon The method 100 may detect the starting position A, final position C, and ramp 14 using one or more sensors. The sensors may include photographic cameras, thermal cameras, 2D or 3D LIDAR detectors, time-of-flight range finders, accelerometers, gyroscopes, ultrasonic sensors, infrared sensors, GPS data, other types of navigational coordinated sensors, or other methods of space awareness. These sensors may be used to determine the position, speed, direction of travel, and other motion data. As an example, a camera may perform a 360-degree scan to locate various objects. The camera may be located on the tractor 10 itself, or a mobile device held by the operator 20. The camera may capture one or more types of camera data such as image, depth, or thermal data. Foreground and background extraction may be performed to help locate and identify various objects, such as the trailer 12, ramp 14, or operator 20. In some cases, the objects may be classified according to known objects retained in a database, such as a flatbed trailer library containing information about known trailers and known ramps.

Sensory data may be supplemented by other data. For example, the tractor 10 and the trailer 12 may provide GPS information about their respective locations to help locate the ramp 14 or other obstacles.

In some examples, details of the ramp 14 may be provided separately from the camera and other sensors. For example, there may be an electronic flatbed data library containing information about flatbed trailers and their corresponding ramps. This may be useful if common trailers are associated with particular ramps. Alternatively, a specific trailer may have a unique trailer ID that is associated with a particular ramp. In these cases, the operator 20 may use their mobile device to obtain the unique trailer ID and the associated ramp information from a communication module on the flatbed trailer or the truck towing the trailer (e.g. using a Bluetooth or other wireless connection between the mobile device and the communication module). The resulting ramp information may be used in conjunction with the camera data to help locate or verify details of the ramp 14. In some cases, the same data and information may be used to verify the final position of the tractor 10.

Step 140 includes calculating a driving path to drive the tractor from the starting position, along the ramp, and to the final position. The driving path may be calculated using a controller on the tractor, mobile device, or a cloud service.

The driving path is generally calculated based on the starting position A, the ramp location, and the final position. Other factors may also be considered when calculating the driving path. For example, the tractor 10 may have a turning radius that constrains the options for the driving path. There may also be nearby obstacles such as rocks or potholes that impede a potential driving path. Obstacles may be identified from various sources such as a camera, GPS coordinates, or prior driving session information.

Step 150 includes autonomously operating the tractor to drive along the calculated driving path. In some embodiments, the tractor 10 may have an onboard motor controller for receiving the driving path. The onboard motor controller then activates a drive system on the tractor 10, which may include wheel motors and a steering system.

Step 160 includes periodically detecting an intermediate position of the tractor and determining if the intermediate position is located on the driving path. The intermediate position may be detected using one or more sensors, which may be the same or similar to the sensors used to detect the starting position A, final position C, and ramp 14.

In some examples, the intermediate position may be detected using sensors associated with the flatbed trailer 12. For example, the trailer 12 may be attached to a truck with a backup camera. The backup camera may monitor the position of the tractor 10, and provide a feedback loop to the tractor 10.

In another example, the trailer 12 may be attached to a truck with one or more mirrors such as a rear-view mirror or side mirror. In these cases, a camera on the tractor 10 may locate one or more of the mirrors on the truck and monitor reflections of the tractor 10 in the mirrors to determine the intermediate position of the tractor 10.

In some examples, the tractor 10 may wirelessly communicate with an electrical system on the trailer 12 (or a truck attached thereto). This may allow remote operation of the backup camera or rotation of the mirrors. In this case, the tractor controller may be considered a "master" and the trailer electrical system may be considered a "slave". This can help extract additional coordinate data regarding the tractor and surrounding objects such as the ramp.

After detecting the intermediate position of the tractor 10, the method 100 checks to see if the tractor 10 is still located along the driving path. If not, the driving path may be recalculated to enhance accuracy. In this case, the driving path may be updated with a course correction to drive the tractor from the current intermediate position B to the final position C. This is particularly beneficial when the tractor 10 moves along the ramp 14 to maintain alignment between the tractor wheels and the ramp 14.

In some examples, course corrections may also be made based on feedback from the operator 20. For example, the tractor camera may detect the position of the operator 20, and adjust the drive path to travel around the operator 20. The tractor camera may also detect gestures from the operator 20. The gestures may include, drive forward, turn left, turn right, back up, or stop. The gestures may correspond to hand signals used within the construction industry. These operator inputs may augment the autonomous driving system.

In some embodiments, the method 100 may iterate through steps 140, 150, and 160 multiple times. Using various sensors to detect the intermediate position can help reduce the need for a second operator. In some examples, the method 100 may be capable of fully autonomous motion without any operator assistance.

Step 170 includes stopping the tractor when it arrives at the final position. When the tractor 10 arrives at the final position, the method 100 may include saving session data, which may include the driving path, applicable course corrections, and other information. In some examples, the session information may be sent to the flatbed data library. This prior session data may be used when calculating future driving paths. For example, the prior session data, may include information about obstacles around the specific geographic location, classification of those obstacles and other objects, ramp data (e.g. model weights and sizes), trailer data, and other information.

The method 100 may also include step 105, which may initialize or validate operation of the system. For example, step 105 may include validating a human operator with voice or facial recognition before sending the drive command. One or more cameras on the tractor 10 may capture an image of the operator 20 and use facial recognition to determine if the operator 20 is an authorized user. In some examples, the facial recognition detection may use a combination of image data, thermal data, and depth data. This may enhance the degree of authentication and prevent fake identification.

Step 105 generally occurs before sending the drive command at step 150. In some cases, step 105 may even occur before locating the starting position A of the tractor 10.

If the operator 20 is not recognized, the tractor 10 may implement one or more security features. For example, the tractor 10 may become disabled. In other examples, the unauthorized operator may be given limited access to the tractor 10. The system may then contact applicable authorities while the limited access is continued. This may give authorities sufficient time to apprehend the unauthorized operator.

After validating the operator as an authorized user, the operator 20 may need to initiate a command to start an autonomous operation session. The operator 20 may also help guide the tractor 10 along the driving path. For example, the operator 20 may use hand gestures to guide the tractor 10 as described above.

In some cases, validation of the human operator may allow tracking of current users. This can be beneficial if someone manages a fleet of tractors, which may be used is multiple geographic locations.

Figure 5:
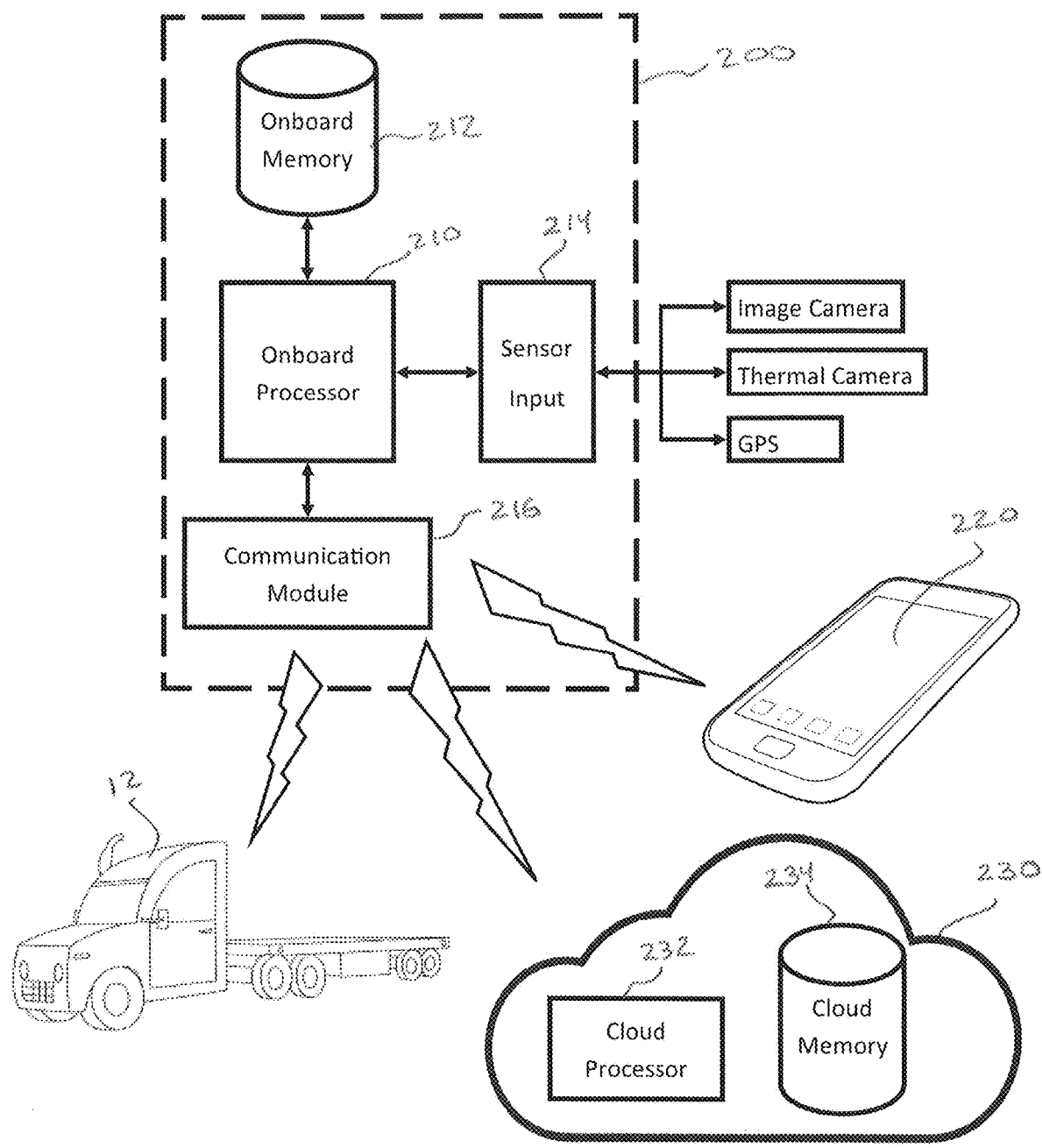
FIG. 5 is a schematic of a motor controller for driving a tractor on a flatbed trailer.

Referring now to FIG. 5, there is a tractor controller 200 for driving a tractor on a flatbed trailer. The controller 200 may be used to implement the method 100, for example, to load the tractor 10 onto the trailer 12. The controller 200 may be located on the tractor 10, and may be referred to as a tractor motor controller. As shown, the motor controller 200 may include an onboard processor 210, onboard memory 212, a sensor input 214, and a communication module 216.

The onboard processor 210 may be a computer or microprocessor running software or firmware applications to execute one or more functions. For example, the processor 210 may be used to determine the final position C for the tractor 10. This may be done by looking up information from flatbed data library, which may be stored in the onboard memory 212. The final position C may also be determined using data from the sensor input 214 (e.g. from a camera). The processor 210 may calculate the driving path 16 and make course corrections based on the current intermediate position B of the tractor 10, along with other information such as obstacle data. The processor 210 may autonomously operate the tractor 10 by driving wheels or activating a steering system. Finally, once at the final position C, the processor 210 may stop the tractor 10. The controller 200 may also notify a user in real time that the tractor 10 has arrived at the final position C. For example, the processor 210 may send a message to a mobile device 220 via the communication module 216. Afterwards, the tractor may resume manual control and the autonomous system may be shutdown.

The sensor input 214 may collect various types of sensor data. As shown, data may be collected from an image camera, thermal camera, GPS or other sensors. The sensors may be on the tractor 10, a mobile device 220, or collected through another system over a wireless connection (e.g. from the trailer 12 or an associated truck).

Information from the sensor input 214 may help identify the starting position A of the tractor 10, the ramp 14 attached to the flatbed trailer 12, and the final position. The sensor input 214 may also serve other purposes such as identifying the current position, speed, acceleration, or direction of travel for the tractor 10.

The communication module 216 may operate via Bluetooth, Wifi, LTE, or another form of wireless communication. The communication module 216 may communicate with the flatbed trailer 12 (or an associated truck), the mobile device 220, or a cloud service 230 over the internet (e.g. as AWS™ or Azure™ cloud services). The communication module 216 may allow the controller 200 to collect other information such as sensory data. The communication module 216 may also allow remote operation of other devices, such as the backup camera or mirrors of a truck attached to the trailer 12.

The cloud service 230 may include a cloud processor 232 and cloud memory, which may replace some or all of the functions of onboard processor 210 or onboard memory 212. The cloud service 230 may be useful when the onboard processor or onboard memory have insufficient capacity in terms of processing power or memory space. In some examples, the cloud processor 232 may be used to calculate the driving path or course corrections. This may be particularly useful with complex geometries and numerous obstacles. The cloud memory 234 may store the flatbed data library for a wide variety of trailers and ramps. Furthermore, the cloud memory may store prior session data from other tractors. Artificial intelligence and machine learning systems may use this larger set of prior session data to optimize driving paths or reduce the chance of having a course correction.

While the embodiments above have been described with respect to loading a tractor onto a flatbed trailer, the teachings herein may be applicable to other scenarios. For example, the tractor 10 may be unloaded from the trailer 12. In this case, the starting position A may be on the trailer 12 and the final position may be on the ground. As another example, a tractor may be driven to or from a garage to mow a field. The tractor may be a riding lawn mower, zero-turn mower, a skid steer tractor, or another type of tractor. In yet other examples, the tractor may be another type of vehicle such as a recreational vehicle (e.g. an ATV or skidoo), construction equipment (e.g. a backhoe, bulldozer, or forklift), agricultural equipment (e.g. a combine harvester), or other heavy equipment.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether some of the embodiments described herein are implemented as a software routine running on a processor via a memory, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A method for driving a tractor on a flatbed trailer, the method comprising:
   a) locating a starting position of the tractor;
   b) determining a final position for the tractor;
   c) searching for a ramp attached to the flatbed trailer;
   d) calculating a driving path to drive the tractor from the starting position, along the ramp, and to the final position;
   e) autonomously operating the tractor to drive along the driving path;
   f) periodically detecting an intermediate position of the tractor and determining if the intermediate position is located on the driving path, and updating the driving path with a course correction to drive the tractor from the intermediate position to the final position; and
   g) stopping the tractor after arriving at the final position.

2. The method of claim 1 further comprising validating a human operator with facial recognition before operating the tractor.

3. The method of claim 1 wherein the intermediate position is detected using at least one sensor attached to the flatbed trailer.

4. The method of claim 3, wherein the sensor includes a backup camera.

5. The method of claim 1, wherein the intermediate position is detected using LIDAR.

6. The method of claim 1 wherein the driving path is determined after verifying details of the ramp and the final position within a flatbed data library.

7. The method of claim 6 wherein the flatbed data library is provided by a communication module on the flatbed trailer.

8. The method of claim 6 wherein session data about the driving path and the course correction is sent to the flatbed data library after the tractor reaches the final position.

9. The method of claim 6 wherein the flatbed data library includes at least one of:
   a) model weights,
   b) classification of objects,
   c) ramp data,
   d) truck data, and
   e) prior session data.

10. The method of claim 1 wherein the intermediate position is detected by remotely activating an electrical system of a truck attached to the flatbed trailer.

11. The method of claim 10 wherein the electrical system operates mirrors on the truck and a camera uses reflections from the mirrors to detect the intermediate position.

12. The method of claim 1 further comprising notifying a user in real time that the tractor has arrived at the final position.

13. A tractor motor controller for driving a tractor on a flatbed trailer, the tractor motor controller comprising:
   a) a sensor input for identifying
      i) a starting position of the tractor; and
      ii) a ramp attached to the flatbed trailer;
   b) a processor for:
      i) determining a final position for the tractor;
      ii) calculating a driving path to drive the tractor from the starting position, along the ramp, and to the final position;

iii) autonomously operating the tractor to drive along the driving path;
iv) periodically detecting an intermediate position of the tractor via the sensor input, and determining if the intermediate position is located on the driving path, and updating the driving path with a course correction to drive the tractor from the intermediate position to the final position; and
v) stopping the tractor after arriving at the final position.

14. The tractor motor controller of claim 13, further comprising notifying a user in real time that the tractor has arrived at the final position.

\* \* \* \* \*